US012546402B2

United States Patent
Ishii et al.

(10) Patent No.: US 12,546,402 B2
(45) Date of Patent: Feb. 10, 2026

(54) ROTARY VALVE

(71) Applicant: AISIN CORPORATION, Aichi (JP)

(72) Inventors: Masato Ishii, Kariya (JP); Hideto Yano, Kariya (JP); Hiroyuki Oya, Kariya (JP); Masao Kihara, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 18/760,511

(22) Filed: Jul. 1, 2024

(65) Prior Publication Data
US 2025/0020224 A1 Jan. 16, 2025

(30) Foreign Application Priority Data

Jul. 12, 2023 (JP) ................................. 2023-114657

(51) Int. Cl.
F16K 11/076 (2006.01)
F16K 11/085 (2006.01)

(52) U.S. Cl.
CPC .......... F16K 11/076 (2013.01); F16K 11/085 (2013.01)

(58) Field of Classification Search
CPC .... F16K 11/076; F16K 11/085; F16K 27/065; F16K 5/0741
See application file for complete search history.

(56) References Cited

U.S. PATENT DOCUMENTS

| 3,584,831 A * | 6/1971 | Hafele ................. F16K 5/0471 251/172 |
| 10,288,178 B2 * | 5/2019 | Nowell ................ F16K 5/0471 |
| 2020/0318750 A1 | 10/2020 | Beisel et al. |
| 2022/0170558 A1 | 6/2022 | Fuoc et al. |

FOREIGN PATENT DOCUMENTS

| JP | 2004-011813 A | 1/2004 |
| WO | 2022/065617 A1 | 3/2022 |

OTHER PUBLICATIONS

Extended European Search Report dated Nov. 8, 2024 from the European Patent Office in Application No. 24180998.7.

* cited by examiner

Primary Examiner — Michael R Reid
(74) Attorney, Agent, or Firm — Sughrue Mion, PLLC

(57) ABSTRACT

There is provided a rotary valve that suppresses deformation of a sealing member and prevents leakage of a fluid while reducing a size of the rotary valve. The rotary valve includes: a rotor that controls circulation of the fluid by rotating about an axis; a sealing member having an opening through which the fluid flows, the sealing member being disposed on a radially outer side of the rotor; a housing that accommodates the rotor and the sealing member; and a cover placed on the housing in such a way as to face against the rotor and the sealing member in an axial direction along the axis, and the cover includes a pressing portion that presses the sealing member when the cover is placed on the housing.

4 Claims, 5 Drawing Sheets

ROTARY VALVE

CROSS REFERENCE TO RELATED APPLICATIONS

This application is based on and claims priority under 35 U.S.C. § 119 to Japanese Patent Application 2023-114657, filed on Jul. 12, 2023, the entire content of which is incorporated herein by reference.

TECHNICAL FIELD

This disclosure generally relates to a rotary valve.

BACKGROUND DISCUSSION

In JP2004-11813A, there is disclosed a cylinder valve that can retain watertightness for a long period of time. More specifically, the cylinder valve includes a valve guide having an opening on a side surface, and a valve element having an opening on a side surface and being inserted in the valve guide, and the cylinder valve is configured in such a way as to control circulation of a fluid by adjusting a position of the opening of the valve element and a position of the opening of the valve guide. In the valve guide, a recessed portion is formed on an outer peripheral side surface of the opening. A sealing member is put into the recessed portion and a pressing member is attached to an opening of the sealing member.

As disclosed in JP2004-11813A, in a configuration in which the sealing member is put into the recessed portion and the opening of the sealing member is pressed by the pressing member, the sealing member is free from a risk of being deformed by pressure applied by a fluid. However, in a configuration in which the recessed portion is formed in the valve guide and the pressing member is attached thereto, a size of the valve may increase. When the recessed portion is not formed in the valve guide and the opening of the sealing member is not pressed by the pressing member in order to reduce a size of the valve, the sealing member may be deformed by pressure applied by a fluid.

A need thus exists for a rotary valve, which is not susceptible to the drawback mentioned above.

SUMMARY

A rotary valve according to the present disclosure includes: a rotor that controls circulation of a fluid by rotating about an axis; a sealing member having an opening through which the fluid flows, the sealing member being disposed on a radially outer side of the rotor; a housing that accommodates the rotor and the sealing member; and a cover placed on the housing in such a way as to face against the rotor and the sealing member in an axial direction along the axis, and the cover includes a pressing portion that presses the sealing member when the cover is placed on the housing.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A rotary valve according to an embodiment of the present disclosure is described below with reference to the drawings. It is to be noted that the present disclosure is not limited to the embodiment described below, and various variations are possible without departing from the spirit and the scope of the present disclosure.

[Basic Configuration]

Figure 1:
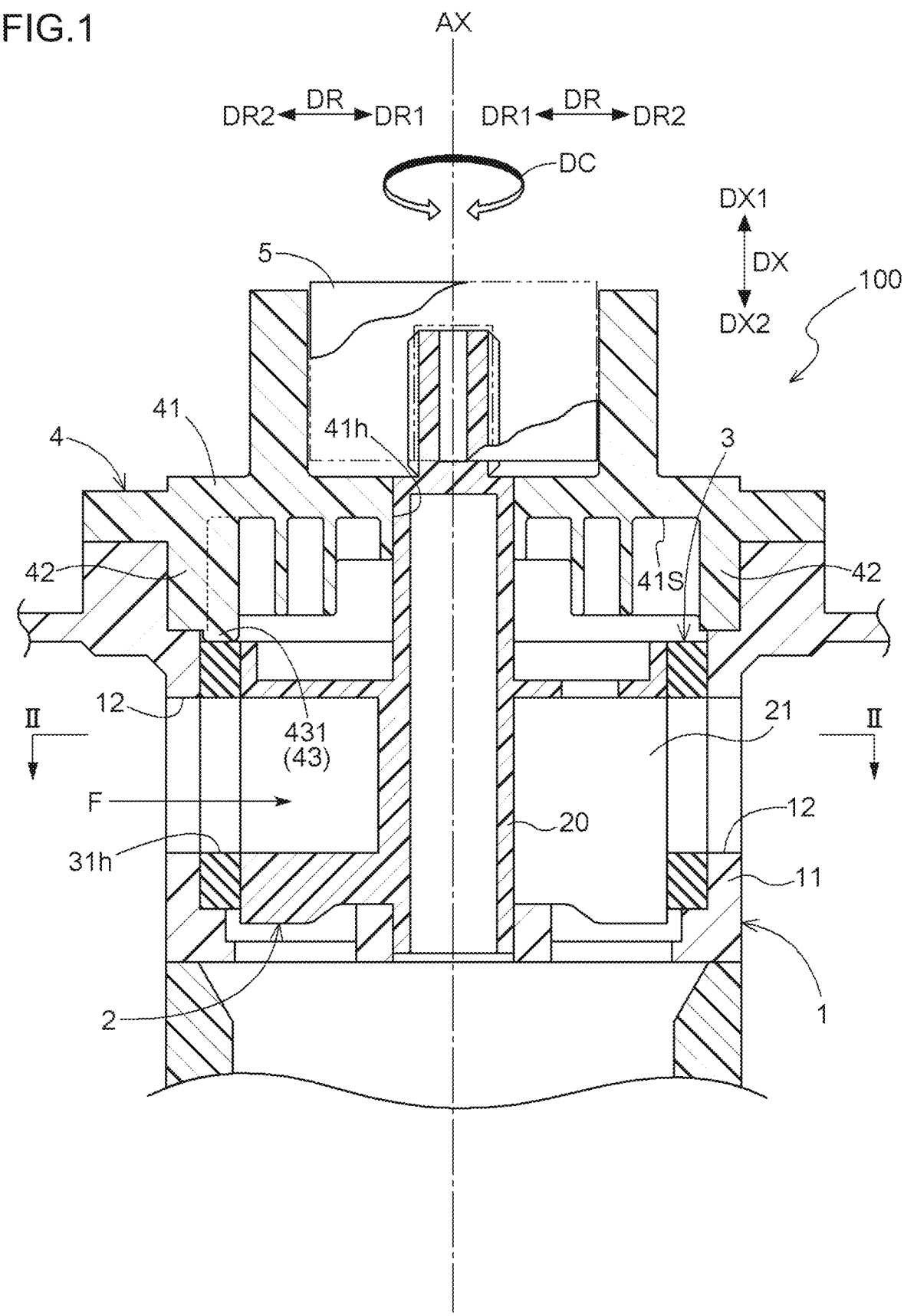
FIG. 1 is a longitudinal sectional view illustrating a structure of a rotary valve according to an embodiment.

FIG. 1 is a sectional view (longitudinal sectional view) taken along an axis AX of a rotary valve 100 according to an embodiment. In the present embodiment, the rotary valve 100 is used, for example, for controlling a fluid F that is circulated in a device to be cooled such as a battery or a motor installed in a vehicle such as an automobile. The fluid F is cooling water such as a long-life coolant (LLC). The fluid F may be an insulating oil of paraffin-base or the like, or a refrigerant made of hydrofluorocarbon (HFC), hydrofluoroolefin (HFO), or the like.

As illustrated in FIG. 1, the rotary valve 100 includes a housing 1, a rotor 2 accommodated in the housing 1, a sealing member 3 disposed between the housing 1 and the rotor 2, a cover 4 placed on the housing 1 in such a way as to cover the rotor 2 and the sealing member 3, and an actuator 5 connected to the rotor 2. The rotary valve 100 is attached to a manifold (not illustrated) with an internal flow path formed therein through which the fluid F is circulated by a driving force of a pump (not illustrated). The actuator 5 transmits torque to the rotor 2. The rotor 2 is rotated by the torque from the actuator 5 about the axis AX. With the rotation of the rotor 2, flow of the fluid F is controlled.

Hereinafter, a direction along the axis AX of the rotor 2 is referred to as an "axial direction DX", a circumferential direction of the rotor 2 as a "circumferential direction DC", and a radial direction of the rotor 2 as a "radial direction DR." In addition, the side in the axial direction DX, viewed from the rotor 2, on which the cover 4 is placed is referred to as "one side in the axial direction DX1", the opposite side thereto as "the other side in the axial direction DX2", the side of the axis AX in the radial direction DR as a "radially inner side DR1", and the opposite side thereto as a "radially outer side DR2."

[Housing]

Figure 2:
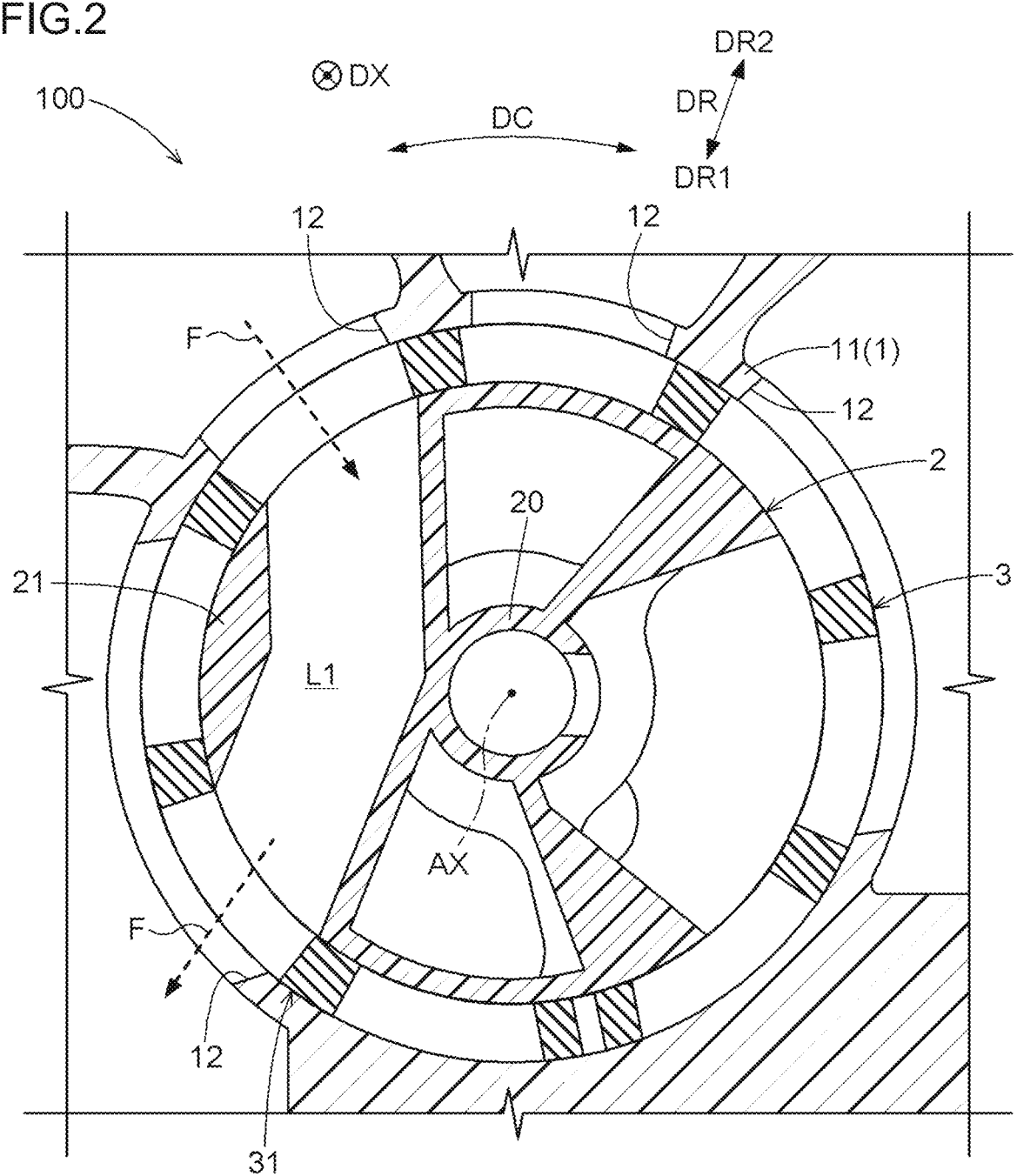
FIG. 2 is a transverse sectional view illustrating the structure of the rotary valve according to the embodiment.

FIG. 2 is a sectional view (transverse sectional view) of the rotary valve 100 taken along the radial direction DR. Note that FIG. 2 illustrates the housing 1, the rotor 2, and the sealing member 3 viewed from the cover 4. As illustrated in FIG. 2, the housing 1 accommodates the rotor 2 and the sealing member 3. The housing 1 includes a housing wall 11 that defines a space in which the rotor 2 and the sealing member 3 are accommodated.

The housing wall 11 has a circular shape when viewed along the axial direction DX. The housing wall 11 has a plurality of ports 12 formed therein along the circumferential direction DC. The ports 12 penetrate through the housing wall 11 along the radial direction DR and connect, via the internal flow path of the manifold (not illustrated), to an external flow path that is connected to a motor, a battery, or the like.

[Rotor]

Figure 3:
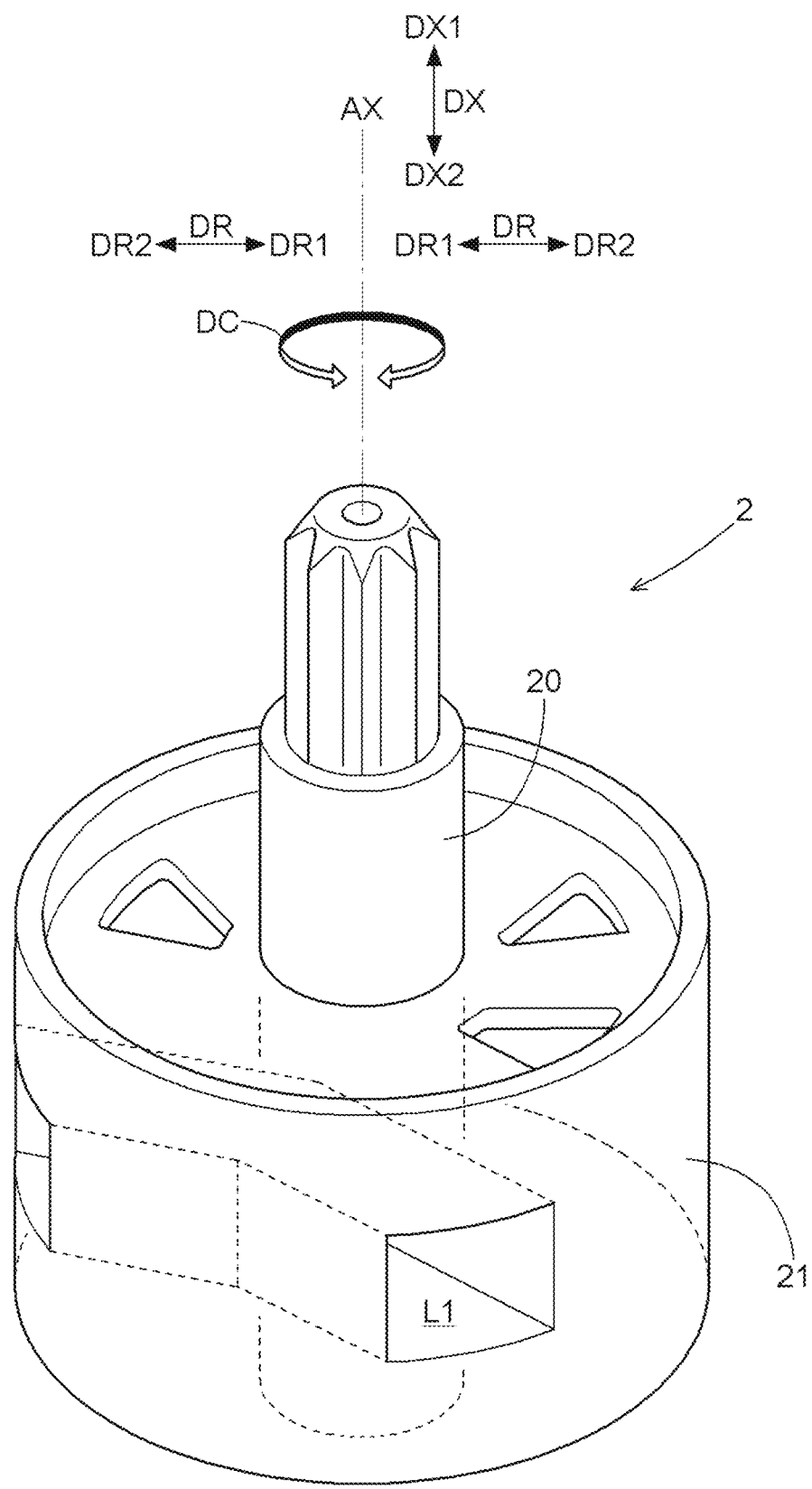
FIG. 3 is a perspective view illustrating a structure of a rotor according to the embodiment.

FIG. 3 is a perspective view illustrating a structure of the rotor 2. As illustrated in FIG. 3, the rotor 2 includes an axial portion 20 concentric with the axis AX and a cylindrical valve portion 21 that is rotatable together with the axial portion 20. The rotor 2 is made of a material such as a resin, and the axial portion 20 and the valve portion 21 are integrally formed.

As illustrated in FIGS. 2 and 3, in the valve portion 21, a valve flow path L1 through which the fluid F flows is formed. The fluid F flows through the valve flow path L1 when the rotor 2 is oriented in such a way that the valve flow path L1 and the ports 12 (see FIG. 2) face against each other in the radial direction DR.

[Sealing Member]

As illustrated in FIG. 2, the sealing member 3 is disposed on the radially outer side DR2 of the rotor 2. The sealing member 3 is disposed on substantially all circumferences of the rotor 2 in the circumferential direction DC, and prevents the fluid F from leaking out of the flow path. The sealing member 3 is constructed of an elastically deformable member, and the sealing member 3 is compressed by the housing 1, the rotor 2, and the cover 4. Thus, leakage of the fluid F out of the flow path (flowing into other flow paths) is prevented. The sealing member 3 is made of rubber such as nitrile butadiene rubber (NBR), fluorine rubber (FKM), or polyurethane rubber (U).

Figure 4:
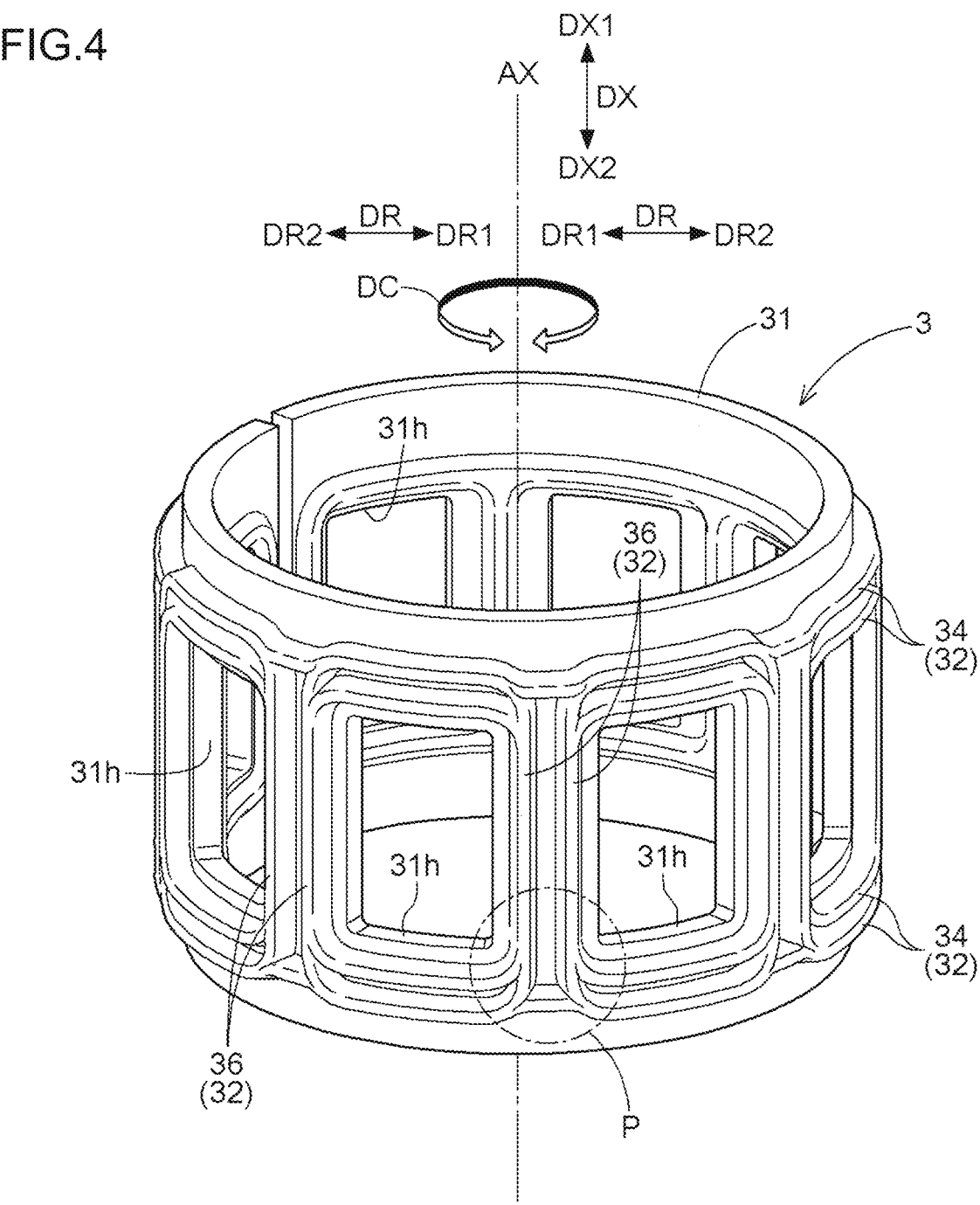
FIG. 4 is a perspective view illustrating a structure of a sealing member according to the embodiment.

FIG. 4 is a perspective view illustrating a structure of the sealing member 3. As illustrated in FIG. 4, the sealing member 3 includes a cylindrical sealing member main body 31. In the sealing member main body 31, a plurality of (in the present embodiment, eight) sealing member openings 31h (an example of openings) are formed. The plurality of sealing member openings 31h are arranged along the circumferential direction DC. Note that the plurality of sealing member openings 31h are formed at positions that are aligned with positions of the plurality of ports 12, which has been described with reference to FIG. 2, and have shapes that match the ports 12.

The sealing member openings 31h penetrate through the sealing member main body 31 in the radial direction DR. The fluid F flows into or out of the valve flow path L1 through the sealing member openings 31h when the rotor 2 is oriented in such a way that the valve flow path L1 and the ports 12 face against each other in the radial direction DR.

The sealing member 3 also includes a plurality of ribs 32 that protrude from the sealing member main body 31 in the radial direction DR. In the present embodiment, the ribs 32 protrude from the sealing member main body 31 toward the radially inner side DR1 and toward the radially outer side DR2.

The plurality of ribs 32 are individually arranged in such a way as to surround the sealing member opening 31h. More specifically, each of the ribs 32 has a plurality of circumferential ribs 34 and a plurality of axial ribs 36.

The plurality of circumferential ribs 34 are arranged in such a way as to face against each other in the axial direction DX across the sealing member opening 31h and the circumferential ribs 34 individually extend along the circumferential direction DC (uninterruptedly formed).

The plurality of axial ribs 36 are arranged in such a way as to face against each other in the circumferential direction DC across the sealing member opening 31h and the axial ribs 36 individually extend along the axial direction DX (uninterruptedly formed).

The circumferential rib 34 and the axial rib 36 connect on the outside of corners of the sealing member opening 31h. Hereinafter, a connected portion between the circumferential rib 34 and the axial rib 36 is referred to as a "junction area P."

[Cover]

Figure 5:
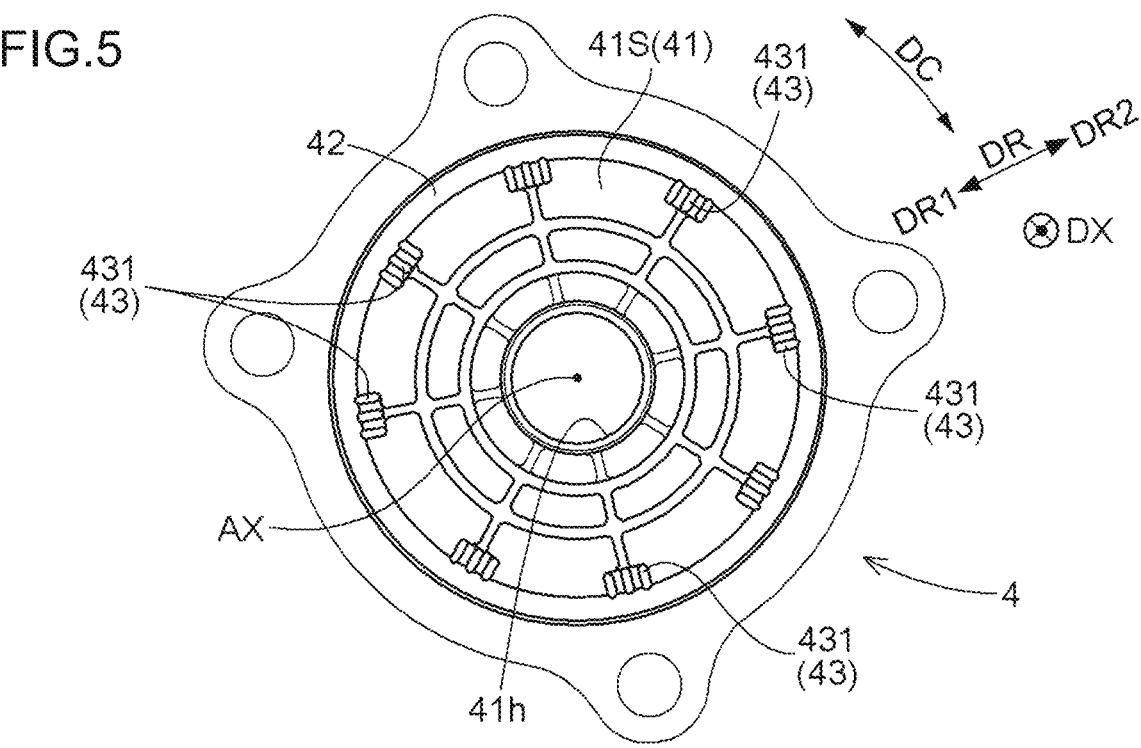
FIG. 5 is a perspective view illustrating a structure of a cover according to the embodiment.

FIG. 5 is a diagram illustrating a structure of the cover 4 (a plan view viewed along the axial direction DX). As illustrated in FIG. 5, the cover 4 is a substantially circular plate when viewed along the axial direction DX. As illustrated in FIG. 1, the cover 4 is placed on the housing 1 in such a way as to face against the rotor 2 and the sealing member 3 in the axial direction DX.

The cover 4 includes a proximal portion 41 having a circular shape (disk shape) when viewed along the axial direction DX and an extension portion 42 that extends in the axial direction DX from the proximal portion 41 as a proximal end (see FIG. 1).

The proximal portion 41 includes a first opposing surface 41S that faces against the rotor 2. In the proximal portion 41, a through-hole 41h that penetrates through the proximal portion 41 in the axial direction DX and into which the axial portion 20 of the rotor 2 is inserted is formed in the center.

The extension portion 42 is tubular (cylindrical) when viewed along the axial direction DX. The extension portion 42 is arranged along a periphery of the proximal portion 41. With the extension portion 42 engaged with the housing 1, the cover 4 and the housing 1 are fixed to each other. For example, an unillustrated helical engaging slot (for example, a male thread) centered around the axial direction DX is formed on the radially outer side DR2 of the extension portion 42 and engages with an unillustrated engaged slot (for example, a female thread) formed in the housing 1. In this manner, the cover 4 and the housing 1 are fixed to each other.

[Deformation Suppressing Portion]

The cover 4 includes a deformation suppressing portion 43 (an example of a pressing portion) that suppresses deformation of the sealing member 3 in the axial direction DX. In the present embodiment, the deformation suppressing portion 43 is arranged on the radially inner side DR1 of the extension portion 42.

Figure 6:
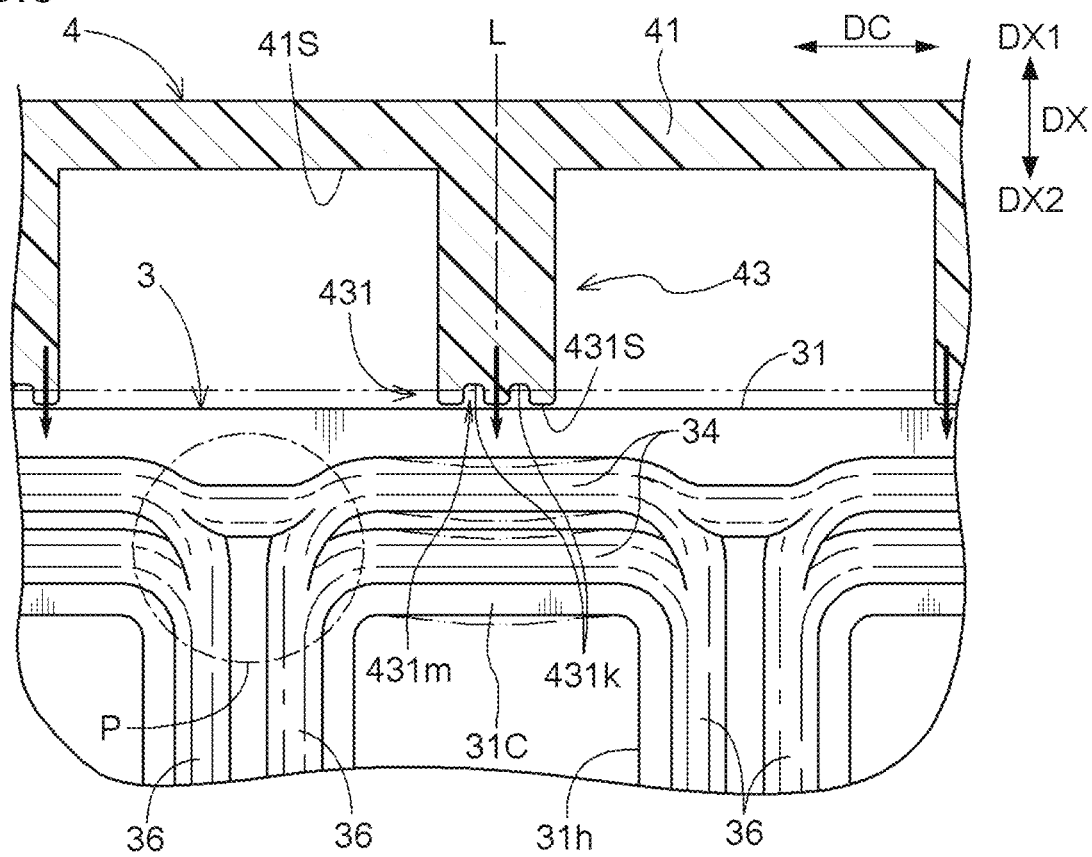
FIG. 6 is a schematic diagram illustrating the structure of the rotary valve in an area near a protrusion according to the embodiment.

As illustrated in FIG. 6, the deformation suppressing portion 43 includes a protrusion 431 that protrudes toward the other side in the axial direction DX2 (in the axial direction DX) from the first opposing surface 41S as a proximal end. FIG. 6 is a schematic diagram illustrating a structure of the rotary valve 100 in an area near the protrusion 431. Note that the extension portion 42 is omitted in FIG. 6.

The protrusion 431 contacts with the sealing member 3 (sealing member main body 31) when the cover 4 is fixed to the housing 1. More specifically, the protrusion 431 is designed to press the sealing member 3 toward the other side in the axial direction DX2 when the cover 4 is fixed to the housing 1, thereby causing the sealing member 3 to be elastically compressed.

As illustrated in FIG. 5, the deformation suppressing portion 43 includes a plurality of protrusions 431 (eight protrusions in the present embodiment). The plurality of protrusions 431 are arranged along the circumferential direction DC. The plurality of protrusions 431 are arranged at intervals from each other in the circumferential direction DC. In other words, the plurality of protrusions 431 are not in contact with the whole circumference of the sealing member 3 (sealing member main body 31) as illustrated in FIG. 6, and arranged in such a way as to contact with portions of the sealing member 3 in the circumferential direction DC. Since the plurality of protrusions 431 are arranged in such a way as to contact with portions of the sealing member 3 in the circumferential direction DC, the sealing member 3 is only partially elastically compressed as illustrated with a long dashed double-dotted line in FIG. 6, thereby enabling prevention of excessive elastic compression of the sealing member 3. Thus, deformation of the sealing member 3 can be suppressed.

As illustrated in FIG. 6, the protrusions 431 are arranged at positions that are aligned with positions of the sealing member openings 31$h$ formed in the sealing member 3, which has been described with reference to FIG. 4. The protrusions 431 are arranged at positions where the protrusions 431 face against the sealing member openings 31$h$ formed in the sealing member 3 in the axial direction DX. In other words, the protrusions 431 are arranged at positions where the protrusions 431 overlap with the sealing member openings 31$h$ when viewed from the axial direction DX.

In other words, the protrusions 431 are arranged at positions where the protrusions 431 do not face against the axial ribs 36 in the axial direction DX. Thus, deformation (twist) of the sealing member 3 caused by deformation of the axial rib 36 can be prevented.

In the present embodiment, the protrusion 431 is arranged at a position where the protrusion 431 overlaps with a central area 31C of the sealing member opening 31$h$ in the circumferential direction DC (a portion including the center of the sealing member openings 31$h$ in the circumferential direction DC) in the axial direction DX when the cover 4 is fixed to the housing 1.

In addition, the protrusion 431 includes a second opposing surface 431S (an example of an opposing surface) that faces against the sealing member 3. In the second opposing surface 431S, a groove 431$m$ is formed. More specifically, the protrusion 431 includes two concave portions 431$k$ that are hollowed in such a way as to be closer to the first opposing surface 41S in the axial direction DX, and the groove 431$m$ is constructed from the two concave portions 431$k$. Note that in the present embodiment, the two concave portions 431$k$ are arranged line-symmetrically with respect to an imaginary line L that passes through the center of the protrusion 431 serving as an axis of symmetry.

Since the groove 431$m$ is formed in the protrusion 431 as described above, the sealing member main body 31 subjected to pressure from the fluid F can penetrate into the concave portion 431$k$ of the groove 431$m$. Thus, deformation of the sealing member 3 in a manner escaping the protrusion 431 (deformation outside of the protrusion 431) can be prevented. Consequently, generation of a gap between the sealing member 3 and a sealing surface (a surface of the housing 1 and/or the rotor 2 with which the sealing member 3 is in contact when the sealing member 3 is oriented in such a way as to prevent leakage of the fluid F) can be prevented.

When the sealing member 3 is deformed, for example, by fluid pressure of the fluid F in a manner escaping the protrusion 431, the junction area P where the circumferential rib 34 and the axial rib 36 intersect is dragged and the axial rib 36 is slanted with respect to the axial direction DX, leading to deformation of the entire sealing member 3; consequently, a gap may be generated between the sealing member 3 and the sealing surface. When a gap is generated between the sealing member 3 and the sealing surface, the fluid F will leak out of the flow path. However, according to the present embodiment, since the concave portion 431$k$ can absorb deformation of the sealing member 3 on one side in the axial direction DX1 (i.e., receive the deformed portion of the sealing member 3), deformation of the sealing member 3 in a manner escaping the protrusion 431 can be prevented. Thus, generation of a gap between the sealing member 3 and the sealing surface can be prevented, and leakage of the fluid F out of the flow path can be prevented.

[Overview of the Present Embodiment]

In the embodiment described above, configurations to be described below are conceived.

(1) The rotary valve 100 includes: the rotor 2 that controls circulation of the fluid F by rotating about the axis AX; the sealing member 3 having the sealing member opening 31$h$ through which the fluid flows F, the sealing member 3 being disposed on the radially outer side DR2 of the rotor 2; the housing 1 that accommodates the rotor 2 and the sealing member 3; and the cover 4 placed on the housing 1 in such a way as to face against the rotor 2 and the sealing member 3 in the axial direction DX along the axis AX, and the cover 4 includes the deformation suppressing portion 43 (pressing portion) that presses the sealing member 3 when the cover 4 is placed on the housing 1.

According to this configuration, deformation of the sealing member 3 in the axial direction DX can be prevented. Thus, leakage of the fluid F out of the flow path can be prevented. In addition, in this configuration, the sealing member 3 is pressed by the deformation suppressing portion 43 (pressing portion) formed in the cover 4 that occludes the inside of the housing 1; therefore, the size of the rotary valve may be reduced compared with a configuration in which a recessed portion for accommodating the sealing member 3 is formed in the housing 1 or the rotor 2 and the sealing member 3 is pressed by a separate member.

(2) In the rotary valve 100 according to (1), a plurality of sealing member openings 31$h$ are formed in the sealing member 3 along the circumferential direction DC of the rotor 2 and the deformation suppressing portion 43 includes a plurality of protrusions 431 arranged along the circumferential direction DC; each of the plurality of protrusions 431 is preferably arranged at a position that is aligned with a position of each of the sealing member openings 31$h$.

According to this configuration, since each of the plurality of protrusions 431 is arranged at a position that is aligned with a position of each of the sealing member openings 31$h$, deformation of the sealing member 3 caused by pressure from the fluid F flowing through the sealing member opening 31$h$ can be suppressed.

(3) In the rotary valve 100 according to (2), the protrusion 431 is preferably arranged at a position where the protrusion 431 overlaps with the central area 31C of the sealing member opening 31$h$ in the circumferential direction DC when viewed from the axial direction DX.

According to this configuration, the protrusion 431 is arranged at a position where the protrusion 431 overlaps with the central area 31C, when viewed from the axial direction DX, in which pressure from the fluid F flowing through the sealing member opening 31$h$ is higher than in other portions. Thus, deformation of the sealing member 3 can be more effectively suppressed.

(4) In the rotary valve 100 according to (2) or (3), the protrusion 431 preferably includes the second opposing surface 431S that faces against the sealing member 3 and in which the groove 431$m$ is formed.

According to this configuration, the sealing member main body 31 of the sealing member 3 subjected to pressure from the fluid F can penetrate into the concave portion 431k of the groove 431m. Thus, deformation of the sealing member 3 in a manner escaping the protrusion 431 (deformation outside of the protrusion 431) can be prevented. Consequently, leakage of the fluid F out of the flow path can be prevented.

[Other Embodiments]

Next, other embodiments of the rotary valve are described.

(a) Although, in the embodiment that has been described above, the deformation suppressing portion 43 includes a plurality of (eight) protrusions 431, the deformation suppressing portion 43 may include only one protrusion 431. In this case, the only one protrusion 431 may have, for example, an annular shape that is formed uninterruptedly along the circumferential direction DC. It is to be noted that the number of the protrusions 431 may be appropriately changed depending on at least one of the number, the shapes, and the positions of the sealing member openings 31h of the sealing member 3.

(b) Although, in the embodiment that has been described above, a case in which the protrusion 431 faces against the central area 31C in the axial direction DX has been described, the protrusion 431 does not have to face against the central area 31C in the axial direction DX.

(c) Although, in the embodiment that has been described above, the groove 431m is constructed from the two concave portions 431k, the number of the concave portions 431k included in the groove 431m is not limited to two, and it may be one or three or more. Alternatively, the groove 431m may be omitted in the protrusion 431.

(d) A method for fixing the cover 4 to the housing 1 is not particularly limited; for example, the cover 4 may be fixed to the housing 1 by means of welding, fastening (fastening using a fastening member such as a screw or a bolt), or the like.

[Industrial Applicability]

The present disclosure may be used for a rotary valve.

A rotary valve according to the present disclosure includes: a rotor that controls circulation of a fluid by rotating about an axis; a sealing member having an opening through which the fluid flows, the sealing member being disposed on a radially outer side of the rotor; a housing that accommodates the rotor and the sealing member; and a cover placed on the housing in such a way as to face against the rotor and the sealing member in an axial direction along the axis, and the cover includes a pressing portion that presses the sealing member when the cover is placed on the housing.

According to this configuration, the cover including the pressing portion is placed on the housing in such a way as to face against the sealing member in the axial direction and the pressing portion of the cover presses the sealing member when the cover is placed on the housing, and therefore, deformation of the sealing member in the axial direction can be prevented. In addition, in this configuration, the sealing member is pressed by the pressing portion formed in the cover that occludes an inside of the housing, and therefore, a size of the rotary valve may be reduced compared with a configuration in which a recessed portion for accommodating the sealing member is formed in the housing or the rotor and the sealing member is pressed by a separate member. Thus, this configuration allows deformation of the sealing member to be suppressed and leakage of the fluid to be prevented while reducing the size.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotary valve comprising:
a rotor that controls circulation of a fluid by rotating about an axis;
a sealing member having a plurality of openings through which the fluid flows, the sealing member being disposed on a radially outer side of the rotor;
a housing that accommodates the rotor and the sealing member; and
a cover placed on the housing in such a way as to face against the rotor and the sealing member in an axial direction along the axis, wherein
the cover includes a pressing portion that presses the sealing member when the cover is placed on the housing,
the plurality of the openings are formed in the sealing member along a circumferential direction of the rotor,
the pressing portion includes a plurality of protrusions along the circumferential direction, and
each of the plurality of protrusions is arranged at a position that is aligned with a position of each of the plurality of openings.

2. The rotary valve according to claim 1, wherein
each of the plurality of protrusions are arranged at a position where a corresponding one of the plurality of protrusions overlaps with a central area of the a corresponding one of the plurality of openings in the circumferential direction when viewed from the axial direction.

3. The rotary valve according to claim 1, wherein
each of the plurality of protrusions includes an opposing surface that faces against the sealing member, the opposing surface having a groove formed therein.

4. The rotary valve according to claim 2, wherein
each of the plurality of protrusions includes an opposing surface that faces against the sealing member, the opposing surface having a groove formed therein.

* * * * *